(12) United States Patent
Kohm et al.

(10) Patent No.: US 6,323,869 B1
(45) Date of Patent: *Nov. 27, 2001

(54) METHOD AND SYSTEM FOR MODALITY DEPENDENT TONE SCALE ADJUSTMENT

(75) Inventors: Kevin S. Kohm, Fairport, NY (US); Richard L. VanMetter, Washington, DC (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/065,717

(22) Filed: Apr. 24, 1998

Related U.S. Application Data

(63) Continuation-in-part of application No. 09/005,369, filed on Jan. 9, 1998.

(51) Int. Cl.[7] ........................................ G09G 5/00
(52) U.S. Cl. ....................... 345/581; 345/589; 345/601
(58) Field of Search ................................. 345/112, 131, 345/139, 147, 439, 432, 581, 589, 582, 601; 382/132; 703/3

(56) References Cited

U.S. PATENT DOCUMENTS

| | | | |
|---|---|---|---|
| 4,737,921 | * 4/1988 | Goldwasser et al. | 345/421 |
| 5,164,993 | * 11/1992 | Capozzi et al. | 382/132 |
| 5,166,786 | * 11/1992 | Sakai et al. | 358/527 |
| 5,250,933 | 10/1993 | Beaudin et al. . | |
| 5,260,873 | * 11/1993 | Hishinuma | 345/432 |
| 5,542,003 | * 7/1996 | Wofford | 382/132 |
| 5,617,313 | * 4/1997 | Namiki | 705/3 |
| 5,671,070 | 9/1997 | Przybylowicz et al. . | |
| 5,774,577 | * 6/1998 | Ueda et al. | 382/162 |
| 5,977,946 | * 11/1999 | Mizobata | 345/112 |

OTHER PUBLICATIONS

Edward Mika et al., Display of Medical Images on CRT Soft–Copy Displays: A Tutorial, SPIE, vol. 2431, pp. 341–359.

Stephen F. Mills et al., Suitability of Non–Linear Display Tables to Clinical PACS, SPIE, vol. 2435, pp. 2–10.

* cited by examiner

*Primary Examiner*—Almis R. Jankus
*Assistant Examiner*—Amr Awad
(74) *Attorney, Agent, or Firm*—William F. Noval

(57) ABSTRACT

A method of selecting a tone scale adjustment function for displaying a medical image on a display comprising the steps of: providing a medical image object having a header with image attributes including at least modality value and manufacturer value; extracting the image attribute values from the header of the medical image object; providing a plurality of tone scale adjustment look up tables, each of which is uniquely identified by at least two image attributes; selecting a tone scale adjustment table from a tone scale selection criteria table; applying the selected tone scale adjustment table to the provided medical image; and displaying the tone scale adjusted medical image.

3 Claims, 4 Drawing Sheets

201 —

| MODALITY | CONVERSION TYPE | MANUFACTURER | MANUFACTURER'S MODEL NAME | SOFTWARE VERSIONS | PHOTO. INTERP. |
|---|---|---|---|---|---|
| CR | | KODAK | | | |

LUT IDENTIFIER — 202

| |
|---|
| 3 |

203 —

| MODALITY | CONVERSION TYPE | MANUFACTURER | MANUFACTURER'S MODEL NAME | SOFTWARE VERSIONS | PHOTO. INTERP. |
|---|---|---|---|---|---|
| CR | | KODAK | CR | QCW_3.01 | |

LUT IDENTIFIER — 204

| |
|---|
| 4 |

205 —

| MODALITY | CONVERSION TYPE | MANUFACTURER | MANUFACTURER'S MODEL NAME | SOFTWARE VERSIONS | PHOTO. INTERP. |
|---|---|---|---|---|---|
| CR | | XYZ | | | |

LUT IDENTIFIER — 206

| |
|---|
| 2 |

207 —

| MODALITY | CONVERSION TYPE | MANUFACTURER | MANUFACTURER'S MODEL NAME | SOFTWARE VERSION | PHOTO. INTERP. |
|---|---|---|---|---|---|
| US | | | | | |

LUT IDENTIFIER — 208

| |
|---|
| 1 |

209 —

| MODALITY | CONVERSION TYPE | MANUFACTURER L | MANUFACTURER'S MODEL NAME | SOFTWARE VERSIONS | PHOTO. INTERP. | LUT IDENTIFIER |
|---|---|---|---|---|---|---|
| CR | | | | | | 1 |
| CR | | KODAK | | | | 2 |
| CR | | KODAK | CR | | | 3 |
| CR | | KODAK | CR | QCW_3.05 | 1 | 4 |
| CR | | KODAK | CR | QCW_3.05 | 2 | 5 |
| MR | | | | | | 6 |
| CT | | | | | | 7 |
| RG | DF | | | | | 8 |
| : | : | : | : | : | : | 9 |

201

| MODALITY | CONVERSION TYPE | MANUFACTURER | MANUFACTURER'S MODEL NAME | SOFTWARE VERSIONS | PHOTO. INTERP. | LUT IDENTIFIER |
|---|---|---|---|---|---|---|
| CR | | KODAK | | | | 3 |

203

| MODALITY | CONVERSION TYPE | MANUFACTURER | MANUFACTURER'S MODEL NAME | SOFTWARE VERSIONS | PHOTO. INTERP. | LUT IDENTIFIER |
|---|---|---|---|---|---|---|
| CR | | KODAK | CR | QCW_3.01 | | 4 |

205

| MODALITY | CONVERSION TYPE | MANUFACTURER | MANUFACTURER'S MODEL NAME | SOFTWARE VERSIONS | PHOTO. INTERP. | LUT IDENTIFIER |
|---|---|---|---|---|---|---|
| CR | | XYZ | | | | 2 |

207

| MODALITY | CONVERSION TYPE | MANUFACTURER | MANUFACTURER'S MODEL NAME | SOFTWARE VERSION | PHOTO. INTERP. | LUT IDENTIFIER |
|---|---|---|---|---|---|---|
| US | | | | | | 1 |

209

| MODALITY | CONVERSION TYPE | MANUFACTURER | MANUFACTURER'S MODEL NAME | SOFTWARE VERSIONS | PHOTO. INTERP. | LUT IDENTIFIER |
|---|---|---|---|---|---|---|
| CR | | | | | | 1 |
| CR | | KODAK | | | | 2 |
| CR | | KODAK | CR | | | 3 |
| CR | | KODAK | CR | QCW_3.05 | 1 | 4 |
| CR | | KODAK | CR | QCW_3.05 | 2 | 5 |
| MR | | | | | | 6 |
| CT | | | | | | 7 |
| RG | DF | | | | | 8 |
| ... | ... | ... | ... | ... | ... | 9 |

FIG. 2

METHOD AND SYSTEM FOR MODALITY DEPENDENT TONE SCALE ADJUSTMENT

REFERENCE TO RELATED APPLICATIONS

This application is a continuation-in-part application of U.S. patent application Ser. No. 09/005,369, filed Jan. 9, 1998.

FIELD OF THE INVENTION

This invention relates in general to digital medical imaging, and relates more particularly to the tonal rendering of digital medical images from multiple modalities.

BACKGROUND OF THE INVENTION

The selection and application of a tone scale adjustment function is a key component to properly display multiple modalities of medical images on a common display device such as a soft copy monitor.

Current medical imaging soft copy systems implement fixed tonal processing parameters for all images. As certain modalities require different tonal processing parameters to be rendered correctly, these modalities are currently displayed with sub-optimal image quality. While DICOM (Digital Imaging and Communication in Medicine) format allows for the specification of a tonal transformation for image display, the transformation is not required and the output space of the transform is not well defined. Therefore, images from different vendors may, and typically do, require different tonal processing to achieve the desired output. For hardcopy, the tone scale may be modified by a 'curve shape' parameter in the printer; there is no analogous parameter for soft copy. There is a need to determine the appropriate tone scale adjustment to be applied to an image for soft copy display based upon information in the DICOM header so that the image is rendered correctly.

Muka, Blume and Daly ("Display of medical images on CRT soft-copy displays: A tutorial", Proc. SPIE, Vol. 2431, pp. 341–359, 1995.) describe differences in tone scales between the following modalities: computed tomography (CT), magnetic resonance (MR), ultrasound (US), digitized film and computed radiography (CR). Muka, et al. states that all images of a particular modality require the same tone scale application for proper cathode ray tube (CRT) visualization. While this is true for a large number of cases, this is not true in every case. For example, the CR images of one manufacturer are processed and distributed with code value linear to density, as described. CR systems of another manufacturer process and distribute images with code values linear to CRT digital to analog converter (DAC) values.

Mills, Ingram, Spetz and Dwyer ("Suitability of non-linear display tables to clinical PACS", Proc. SPIE, Vol. 2435, pp. 2–10, 1995.) report that applying a CRT gamma adjustment that the user can modify interactively on a soft copy workstation yield diagnostic improvements for CR images. Mills, et al. propose that similar results may be obtained for other modalities including MR, CT and digital fluoroscopy based upon results from CR. Planned research includes automation of gamma correction "based upon anatomical region, modality, acquisition device characteristics and image histogram data". The proposed research work described in the paper indicates additional information is required to select the tone scale, namely knowledge of anatomical region and image histogram data.

Przybylowicz, et al. (U.S. Pat. No. 5,671,070, issued Sep. 23, 1997) describe a method for sending an image across a network such that the tone of the image is properly rendered on the output device. Przybylowicz et al. requires that the acquisition device generate and send, along with the image, a LUT containing information on how to tonally render the image. Various methods for creating the final LUT to be applied to the image are described. As a soft copy device may display images from various vendors, a method for proper tonal rendering of all images, regardless of source, is desired.

Hishinuma (U.S. Pat. No. 5,260,873, issued Nov. 9, 1993) describes an apparatus for applying a gradation table or tone scale to a medical image. Hishinuma does not indicate how to select the gradation table to be applied to the image.

Beaudin et al. (U.S. Pat. No. 5,250,933, Oct. 5, 1993) describes a method and apparatus for applying a different color mapping or tone scale to different images on the same system. Beaudin et al. does not claim a method for determining what LUT should be applied to the image.

SUMMARY OF THE INVENTION

This invention, in general, allows a DICOM image processed and displayed on a soft copy system to tonally match the same image printed to film. Utilizing particular DICOM elements and prior knowledge about expected output device tonal characteristics, a tone scale adjustment function is selected to be applied to an image. Therefore, the quality of the image is improved by applying the appropriate tonal processing prior to display.

According to a feature of the present invention, there is provided a method of selecting a tone scale adjustment function for displaying a medical image on a display comprising the steps of: providing a medical image object having a header with image attributes including at least modality value and manufacturer value; extracting the image attribute values from the header of the medical image object; providing a plurality of tone scale adjustment look up tables, each of which is uniquely identified by at least two image attributes; selecting a tone scale adjustment table from a tone scale selection criteria table; applying the selected tone scale adjustment table to the provided medical image; and displaying the tone scale adjusted medical image.

ADVANTAGEOUS EFFECT OF THE INVENTION

The invention has the following advantages.

1. Consistent display of various medical image types on the same display device.

2. Proper tone scale visualization of CR images produced by different manufacturers on the same display device.

3. Proper tone scale visualization of CR images and CT/MR images on the same display device.

4. User interaction in adjusting tone scale is not required. A single tone scale adjustment is identified for application to an image of a particular modality, manufacturer, etc.

5. The medical image acquisition device does not need to generate a source LUT (Look Up Table) and send the LUT along with the image. Rather, information provided with the image infers what LUT should be applied to the image.

BRIEF DESCRIPTION OF THE DRAWINGS

FIG. 2 shows examples for one method to select a tone scale adjustment function.

DETAILED DESCRIPTION OF THE INVENTION

Figure 1:
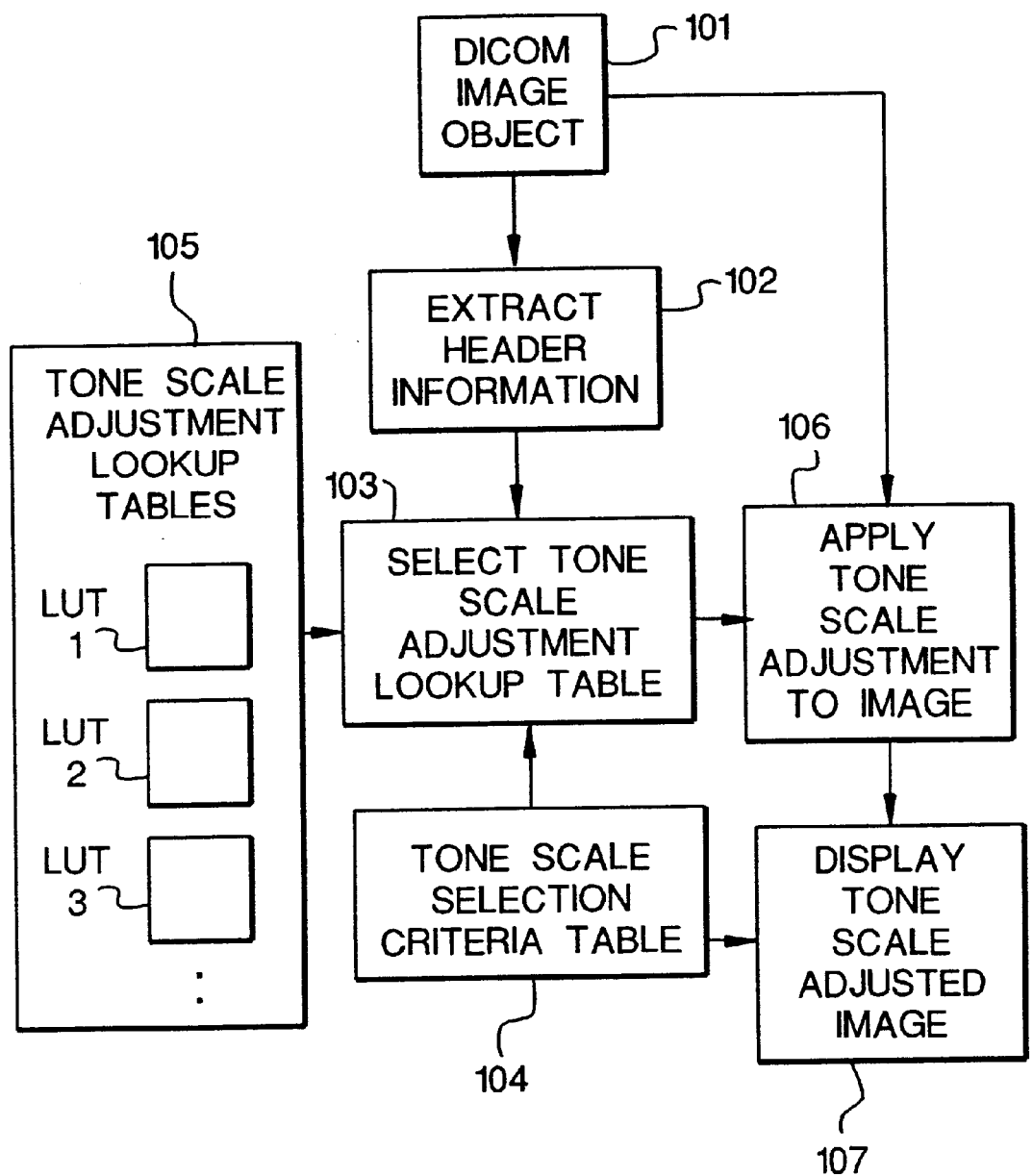
FIG. 1 is a function block diagram of a tone scale adjustment system.

FIG. 1 shows a tone scale adjustment system. The DICOM image object (101) is the input to this system and contains a medical image including header information, or elements, describing the attributes of the image. The DICOM image object is then passed to a function to extract header information (102), where select elements are read and stored for later use. Six DICOM elements are utilized in this invention: Modality—DICOM element (0008, 0060), Conversion Type—DICOM element (0008, 0064), Manufacturer—DICOM element (0008, 0070), Manufacturer's Model Name—DICOM element (0008, 1090), Software Versions—DICOM element (0018, 1020) and Photometric Interpretation—DICOM element (0028, 0004). The values of these six elements are compared to the values in the tone scale selection criteria table (104) in the select tone scale adjustment lookup table (103) function. The LUT identifier has now been selected in step (103). This value of the LUT identifier is then used to select one LUT from the tone scale adjustment lookup tables (105). This LUT is then applied to the original image data from the DICOM image object (101) in the apply tone scale adjustment to image (106) step. Lastly, the image is displayed by the display tone scale adjusted image (107) function.

Figure 4:
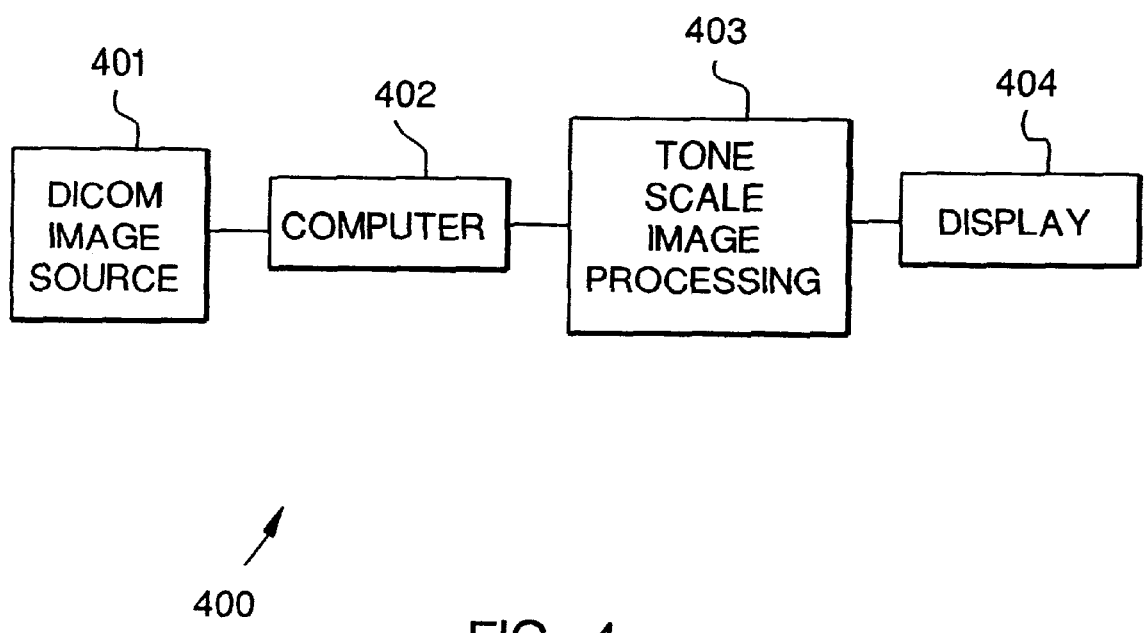
FIG. 4 is a block diagram of apparatus incorporating the present invention.

Referring to FIG. 4, there is shown apparatus incorporating the present invention. Apparatus 400 includes a DICOM image source 401, computer 402, image processor 403, and display 404 (CRT, LCD). DICOM image object 101 is provided by source 401. Functions 102, 103, 104, 105 are carried out by computer 402. Function 106 is carried out by processor 403 (or by computer 402) and function 107 is carried out by display 404.

The functions 103 and 104 in FIG. 1 is better described as follows. Example image 1 header element values (201) are shown. A blank value for an element implies that the element was not defined in the DICOM header and has NULL value. An example tone scale selection criteria table (209) is shown. In this table, a blank value indicates all possible element values, including the NULL value, except those values present in the table for which the remaining four element values match. This example tone scale selection criteria table is utilized to determine the value of the look up (LUT) identifier selected for example image 1 (202).The value of the LUT identifier selected for image 1 is determined by the value of the LUT identifier for which the six associated elements in the example tone scale selection criteria table yield a "true" output to the following Boolean expression:

$$\left[\begin{pmatrix}\text{Value of Modality}\\ \text{element from image}\\ \text{header element values}\end{pmatrix} \text{AND} \begin{pmatrix}\text{Value of Modality in}\\ \text{tone scale selection}\\ \text{criteria table}\end{pmatrix}\right]$$

AND $$\left[\begin{pmatrix}\text{Value of Conversion Type}\\ \text{element from image}\\ \text{header element values}\end{pmatrix} \text{AND} \begin{pmatrix}\text{Value of Conversion}\\ \text{Type in tone scale}\\ \text{selection criteria table}\end{pmatrix}\right]$$

AND $$\left[\begin{pmatrix}\text{Value of Manufacturer}\\ \text{element from image}\\ \text{header element values}\end{pmatrix} \text{AND} \begin{pmatrix}\text{Value of Manufacturer}\\ \text{in tone scale selection}\\ \text{criteria table}\end{pmatrix}\right]$$

AND $$\left[\begin{pmatrix}\text{Value of Manufacturer's}\\ \text{Model Name element from}\\ \text{image header element values}\end{pmatrix} \text{AND} \begin{pmatrix}\text{Value of Manufacturer's}\\ \text{Model Name in tone scale}\\ \text{selection criteria table}\end{pmatrix}\right]$$

AND $$\left[\begin{pmatrix}\text{Value of Software Versions}\\ \text{element from image header}\\ \text{element values}\end{pmatrix} \text{AND} \begin{pmatrix}\text{Value of Software}\\ \text{Versions in tone scale}\\ \text{selection criteria table}\end{pmatrix}\right]$$

AND $$\left[\begin{pmatrix}\text{Value of Photometric}\\ \text{Interpretation element from}\\ \text{image header element values}\end{pmatrix} \text{AND} \begin{pmatrix}\text{Value of Photometric}\\ \text{Interpretation in tone scale}\\ \text{selection criteria table}\end{pmatrix}\right]$$

The value for the LUT identifier selected for example image 1 (202) may be determined as follows. The value of the Modality element in example image 1 header element values (201) is "CR". This is compared to the value of Modality in each entry in the example tone scale selection criteria (209). As can be seen, five entries match "CR" in this example. These entries correspond to LUT identifier "2", "3", "4", "5" and "6". The next value to be compared is Conversion Type. The value of Conversion Type in the example header (201) is "NULL". All five of the entries which match the Modality element from the previous comparison include "NULL" as a value for Conversion Type. Therefore these five entries are still candidates for use. The next element to be compared is Manufacturer. The value of Manufacturer in the example header (201) is "Kodak". Four of the five candidate entries in the selection table (209) have a "Kodak" value for Manufacturer, namely entries with LUT identifier values of "3", "4", "5" and "6". These entries are the remaining candidates. Manufacturer's model name is the next comparison. The value of Manufacturer's model name in the example header (201) is "NULL". Only one of the candidate entries in the selection table (209) match the "NULL" value, the entry with a LUT identifier value of "3". The final two comparisons are Software Versions element and Photometric Interpretation element. The values of Software Versions element and Photometric Interpretation element in the example header (201) are both "NULL". The values of the Software Version element and Photometric Interpretation element in the candidate entry matches the "NULL" value, indicating that this entry should be selected. Therefore the value of LUT identifier selected for example image 1 (202) is "3".

It should be noted that the first entry in the example tone scale selection criteria table (209) will insure that every set of header element values will yield a "true" value for the Boolean expression. This occurs because all values are blank, indicating that any set of values not explicitly defined by another entry in the table (209) will be an allowable match for this entry.

FIG. 2 shows three other example headers (203, 205 and 207) which yield LUT identifiers (204, 206, 208 respectively). These examples may be evaluated utilizing the same method described above.

Figure 3A:
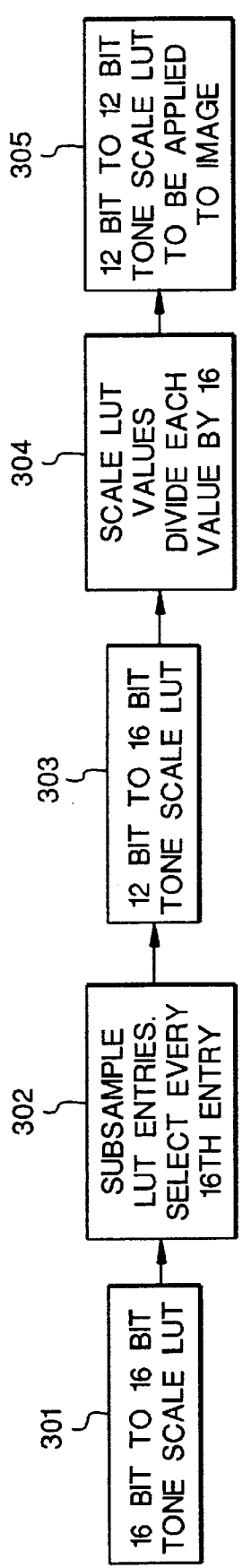
FIG. 3 shows tone scale adjustment function conversion techniques.
Figure 3B:
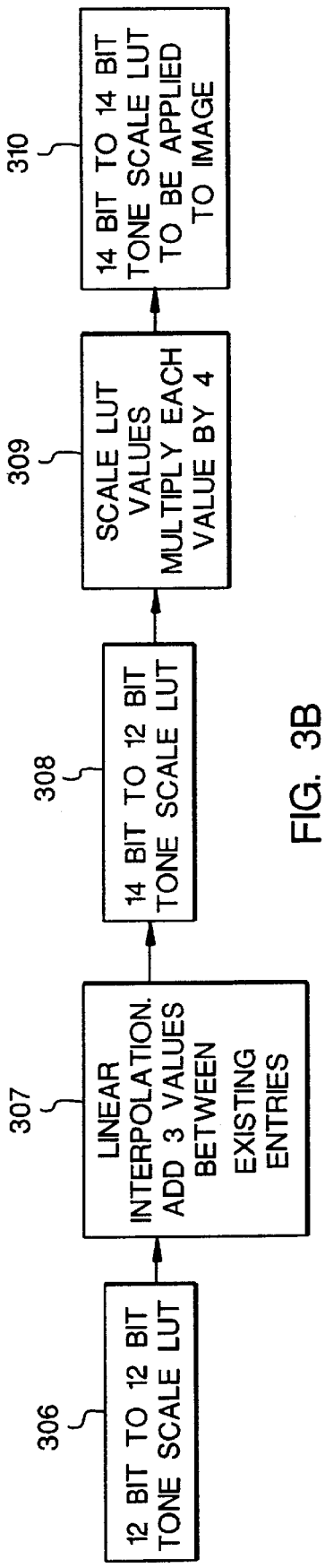
Figure 3C:
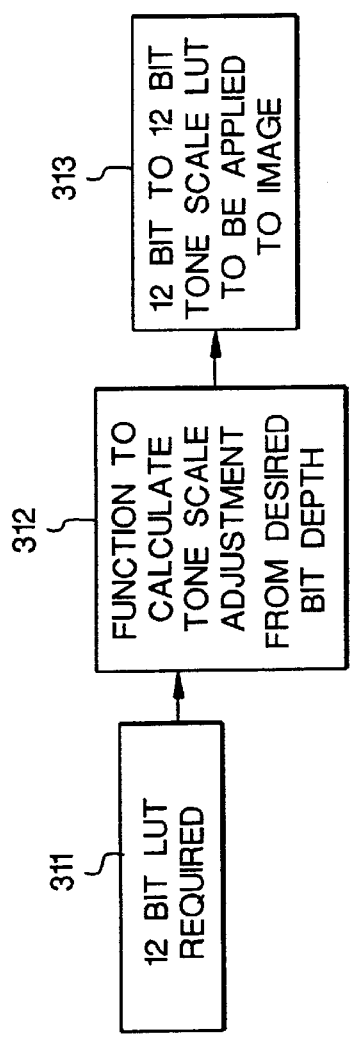

Care must be taken in the definition and application of the tone scale adjustment. Medical image pixel code values from certain vendors and modalities may be stored in different bit depths in the DICOM image object. This may require that the tone scale adjustment function (or LUT) be scaled for the particular image being adjusted. Common methods to perform this scaling are described as follows; diagrams can be seen in FIGS. 3A–3C. One method is to store a LUT at the highest bit depth to be used (Example A-FIG. 3A). In the case of current medical image data, this value is 16 bits, therefore the LUTs would be constructed as 16 bit to 16 bit LUTs (301). For any image which is represented by a fewer number of bits, say 12 bits, the LUT would be subsampled (302) to the required bit depth. In this example, every 16$^{th}$ entry in the 16 bit LUT would be used to create the 12 bit to 16 bit LUT (303). The output value of the LUT may also need to be scaled in magnitude (304) to the same bit depth; the output values would be divided by 16 to create the 12 bit to 12 bit LUT (305).

Another method is to define the LUT at the most common bit depth for which the LUT will be used. In Example B (FIG. 3B), a 12 bit to 12 bit LUT (306) is selected. If an image is received at a higher bit depth, say 14 bits, the LUT can be interpolated via linear interpolation (307), or another interpolation method to the higher bit depth in number of entries. The result of this operation in the example is a 14 bit to 12 bit LUT (308). The LUT then must be scaled in magnitude (309) to the new bit depth, in this case, the LUT entry values must be multiplied by 4. The output of this scaling results in a 14 bit to 14 bit LUT (310). If an image is received where the pixel code values are stored as a fewer number of bits, the subsampling and scaling method described in the first example should be used.

Another possible method, shown in Example C (FIG. 3C), is to define a functional representation of the adjustment such that the tone scale adjustment is a function of bit depth (312). By specifying a desired bit depth for the LUT (311), the function will automatically generate the required LUT (313). A 12 LUT is required.

The invention has been described in detail with particular reference to certain preferred embodiments thereof, but it will be understood that variations and modifications can be effected within the spirit and scope of the invention.

PARTS LIST

101 DICOM image object.
102 Extract header information.
103 Select tone scale adjustment lookup table.
104 Tone scale selection criteria table.
105 Tone scale adjustment lookup tables.
106 Apply tone scale adjustment to image.
107 Display tone scale adjusted image.
201 Example image 1 header element values.
202 LUT identifier selected for example image 1.
203 Example image 2 header element values.
204 LUT identifier selected for example image 2.
205 Example image 3 header element values.
206 LUT identifier selected for example image 3.
207 Example image 4 header element values.
208 LUT identifier selected for example image 4.
209 Example tone scale adjustment selection criteria table.
301 16 bit to 16 bit tone scale LUT.
302 Subsample LUT entries. Select every 16$^{th}$ entry.
303 12 bit to 16 bit tone scale LUT.
304 Scale LUT values. Divide each value by 16.
305 12 bit to 2 bit tone scale LUT to be applied to image.
306 12 bit to 12 bit tone scale LUT.
307 Linear interpolation. Add 3 values between existing entries.
308 14 bit to 12 bit tone scale LUT.
309 Scale LUT values. Multiply each value by 4.
310 14 bit to 14 bit tone scale LUT to be applied to image.
311 12 bit LUT required.
312 Function to calculate tone scale adjustment from desired bit depth.
313 12 bit to 12 bit tone scale LUT to be applied to image.
400 apparatus
401 image source
402 computer
403 image processor
404 display

What is claimed is:

1. A method of selecting a tone scale adjustment function for displaying a medical image on a display comprising the steps of:

providing a medical image object having medical image, and having a header with image attribute values including at least modality value and manufacturer value;

extracting the image attribute values from the header of said medical image object;

providing a plurality of tone scale adjustment look up tables, each of which is uniquely identified by at least the two image attributes modality value and manufacturer value;

selecting a tone scale adjustment table from a tone scale selection criteria table based on said extracted image attribute values including modality value and manufacturer value;

applying the selected tone scale adjustment table to the provided medical image; and displaying the tone scale adjusted medical image on a display.

2. The method of claim 1 wherein said provided medical image object includes pixel bit depth data in said header and including the step of scaling said selected tone scale adjustment table to the pixel depth of said provided medical image.

3. The method of claim 1 wherein said providing a medical image object step includes providing a header further including one or more of the following image attributes: conversion type value, model name value, software versions value, photometric interpretation value.

* * * * *